United States Patent [19]
Richard et al.

[11] Patent Number: 4,976,207
[45] Date of Patent: Dec. 11, 1990

[54] PROCESS OF IMPROVED POSTCOMBUSTION WITH RAPID TRIGGERING AND MEANS FOR IMPLEMENTATION IN A HEATING AND INCINERATION DEVICE

[75] Inventors: Robert Richard, Thann; Gilles Prado, Rimbach pres Masevaux, both of France

[73] Assignee: Fondis, S.A., Thann, France

[21] Appl. No.: 289,030

[22] Filed: Dec. 23, 1988

[30] Foreign Application Priority Data

Dec. 23, 1987 [FR] France ................................ 87 18257

[51] Int. Cl.$^5$ ............................ F23B 5/00; F23C 9/00; F23G 7/06
[52] U.S. Cl. .................................. 110/214; 110/302; 110/348; 431/5
[58] Field of Search ............... 110/214, 302, 348, 210, 110/211; 422/168; 431/5

[56] References Cited

U.S. PATENT DOCUMENTS

| | | |
|---|---|---|
| 3,678,869 | 7/1972 | Bowman ............................. 110/214 |
| 4,395,956 | 8/1983 | Hand, Jr. et al. ............... 110/214 X |
| 4,502,395 | 3/1985 | Barnett .............................. 110/214 |
| 4,538,529 | 9/1985 | Temelli ........................... 110/214 X |
| 4,635,568 | 1/1987 | Angelo, II ........................ 110/214 |
| 4,674,417 | 6/1987 | Hoskinson ........................ 110/214 |
| 4,690,126 | 9/1987 | Jencks et al. .................. 110/214 X |
| 4,829,914 | 5/1989 | Boucher ........................... 110/302 X |

Primary Examiner—Edward G. Favors

[57] ABSTRACT

Apparatus for carrying out a postcombustion process includes a combustion chamber (2) and a post-combustion chamber (4) provided within the vicinity of the outlet of the combustion chamber (2). A conduit (8) is fluidically connected to the post-combustion chamber (4) so as to inject fresh combustion air thereinto. A heating device (9) is disposed within the conduit (8) for pre-heating the fresh combustion air to be injected into the post-combustion chamber (4). Various sensors (11,12,14) are provided within the combustion chamber (2), post-combustion chamber (4), and conduit (8), and an electronic control circuit (13) is operatively connected to the sensors (11,12,14) as well as to the heating device (9) so as to control the heating device (9) in response to detected sensed signals from the sensors (11,12,14).

36 Claims, 4 Drawing Sheets

PROCESS OF IMPROVED POSTCOMBUSTION WITH RAPID TRIGGERING AND MEANS FOR IMPLEMENTATION IN A HEATING AND INCINERATION DEVICE

The present invention relates to a process of improved postcombustion for solid-fuel heating equipment and for incinerators. It also relates to the means intended to implement it.

More particularly, the invention relates to a process of rapid triggering and maintenance of the postcombustion of unburned volatile materials that issue from the combustion in boilers, solid-fuel heating devices and equipment and in incinerators that burn industrial and household waste.

In certain regions and under certain climatic conditions, air pollution reaches high levels particularly in winter, the season when heating equipment operates most often at maximum capacity.

Faced with this threat to the environment and human beings, there is reason to appreciably lower the gas-pollutant emission rate of heating equipment and incinerators.

Gas-pollutant rates should drop below a threshold appreciably lower than the threshold currently reached by current equipment at present.

Many devices and processes have been imagined to reduce the rates of volatile materials present in combustion gas and smoke so as to decrease atmospheric pollution, increase yield and reduce the risks of chimney fires.

Thus, we are familiar with catalysts that chemically induce the reaction of oxidation necessary to enable the complete combustion of flammable volatile materials escaping with the smoke in order to obtain neutral and stable compounds that are non-polluting or sufficiently low-polluting to be tolerated.

When they function well, these catalysts possess a satisfactory purifying yield. However, they present several considerable faults which limit their use or will make users prefer other types of devices or systems that produce the same effects.

Their high cost is the first disadvantage. Indeed, the rare metals that garnish the cells used for the catalysis reaction are fairly expensive.

Furthermore, use of the catalyst necessitates several usage precautions as well as particularly exacting obligations in addition to the work of fire maintenance and preparation.

Firstly, this means the systematic switching-off of the catalyst at the time of starting; otherwise there occurs deterioration of the cartridge by plugging of the cells. This deterioration necessitates the replacement of the active cartridge.

Secondly, this means not superheating to avoid damaging the surface supporting the catalyst. This danger, which is particularly insidious, is increased by the strong heat released by the forced postcombustion.

We are also familiar with devices and processes for neutralizing the pollutant gases from the combustion fuels, specifically solid fuels.

These are catalytic gaseous complexes mixed with combustive air and injected into the furnace to produce a catalytic reaction that improves the combustion and correlatively reduces the production of unburned gas and volatile materials issuing from the combustion.

This system necessitates the adjunction of conduits and a plant for producing these gaseous complexes. Using it on small heating equipment is nearly impossible for economic reasons.

We are also familiar with chemical neutralization of the combustion gasses put out by the furnace.

Unfortunately, although these processes give good results, they are totally unusable on a household, i.e. family, scale.

Lastly, we are familiar with furnaces that have a postcombustion volume situated in the upper part of the combustion chamber.

This volume cannot give satisfaction due to its location and its structure because it is not possible to control a postcombustion in the furnace without greatly disturbing the combustion, which must remain the best possible in the furnace.

The purpose of the present invention is to remedy all the various disadvantages of the processes and devices indicated above.

To this end, the invention relates to a process of improved postcombustion characterized in that one injects, at least one level, into a postcombustion chamber adjacent to the furnace outlet, a flow of new air, preheated or not, oxygen enriched or not, heated to a temperature of at least 400 degrees centigrade, preferably to 500 degrees centigrade, at the start of combustion and then at each activation or reactivation of the fire.

The numerous advantages of the invention are as follows:
 no device through the smoke-exhaust conduit;
 maximum heat yield;
 particularly low pollution rate;
 reasonable appreciation in value;
 elimination of any constricting manipulation;
 decrease of corrosion;
 compact unit;
 recovery of energy with simple and reliable means;
 no deterioration: life span equal to the life span of the furnace.

The invention will be clearly understood by reading the following description, which is provided as a non-restrictive example of one method of execution with reference to the accompanying drawings, in which:

FIG. 6 is a schematic sectional view of the circuit to bring in new air into a so-called tiered postcombustion version, implementing separate channels;

FIG. 7 is a sectional schematic view of new air brought into a postcombustion version that implements a double channel;

FIG. 8 is a horizontal sectional view of a postcombustion chamber in the smoke-outlet conduit with representation of the adjoining new-air inlet conduit.

Figure 1:
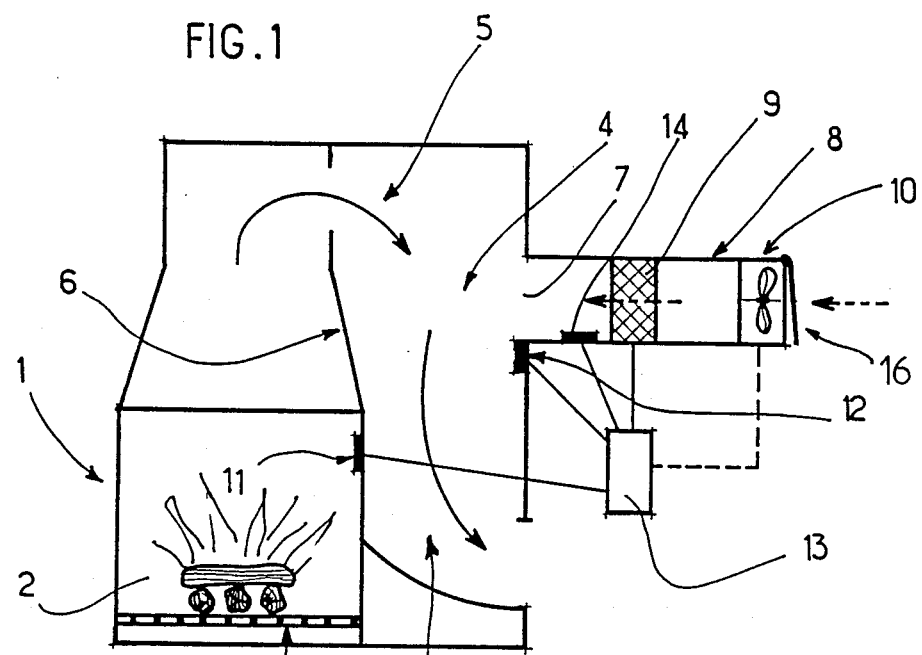
FIG. 1 is a vertical-section schematic view of a closed chimney furnace with postcombustion chamber adjoining the furnace pursuant to the invention.

The general inventive idea consists of injecting, at least one level, into a postcombustion chamber situated as closely as possible to the furnace outlet, a current of new air, i.e. combustive air that is preheated and then brought, by at least one means of independent heating outside the furnace, to at least 400 degrees centigrade, preferably to 500 degrees centigrade, combined with the heat issuing from the furnace, from the start of combustion until self-maintenance of the postcombustion, to continue to inject this flow of new air at a lower temperature, at least equal to 200 degrees centigrade then to bring its temperature back to at least 400 degrees centigrade, for example 500 degrees centigrade, at least at each activation or reactivation of the fire until self-maintenance of the postcombustion then to continue to inject this current of new air at a lower temperature, for example by eliminating the independent heating means.

According to one variant, we inject air enriched with simple, active or activated oxygen or oxygen enriched with a gas or a gaseous complex, catalytic or oxidizing, that facilitates combustion.

According to another variant, the postcombustion chamber is adjoined to the furnace or integrated into the furnace.

According to still another variant of this process, the air is enriched using ozone produced by a generator at the opening for injection into the postcombustion chamber.

Thus we avoid fluctuations in the temperature of the furnace by an independent heating means outside the furnace.

Below we describe in greater detail the process of postcombustion according to the invention then in a second part the various means intended to implement it and some of their variants on an example of a closed chimney furnace and stove using wood as fuel.

Of course, devices using other fuels are suitable as well. This is the case with coal, household and industrial waste and household garbage in incinerators.

More particularly, the process consists of triggering the postcombustion as rapidly as possible after the start of the combustion of the solid fuel, by injecting—into the postcombustion chamber situated near the furnace, as close as possible to the furnace, specifically near the furnace smoke outlet—combustive new air, i.e. containing a sufficient quantity of oxygen, enriched or not, activated or not, previously brought to a triggering temperature of at least 400 degrees centigrade, for example 500 degrees centigrade.

This air is brought to the triggering temperature of at least 400 degrees centigrade, for example 500 degrees centigrade, totally or at least partially by a means of heating independent of the furnace, for example heating by electricity by a means with low thermal inertia, so as to trigger the postcombustion as soon as possible after the start of the combustion of the wood.

For reasons of energy conservation, we anticipate preheating the air to, for example, a temperature of from 200 degrees centigrade to 400 degrees centigrade by a circuit that brings the new air into direct or indirect contact with at least one wall of the furnace.

This preheating is useful and effective only in the phase immediately following the initial phase, when the heat of the combustion has been transmitted to the aeraulic preheating circuit and thereby heats the new air.

During the initial phase, the independent electric heater plays the principal role. Therefore, its action should be reinforced while diminishing its inertia.

To do this, we partially block the fresh new air inlet, because it is outside the furnace, while the electric heating element warms up. Thus we avoid applying to this element outside air at a temperature that is too low with relation to the temperature to be reached.

As the new-air-supply circuit heats up from the warming of the furnace, we are able to totally or gradually open the air inlet.

As an illustrative example of operation, below we cite the different characteristics of operation corresponding to a typical real case of combustion of common wood for a period of observation limited to 4 hours in a closed chimney furnace.

The general conditions were as follows:
wood: beech with relative moisture equal to 35%
start-up of electrical resistances: five minutes for the preheater and four minutes for the heater
period of time that the new air inlet is closed: five minutes
hot postcombustion triggering time interval: four minutes
cold triggering interval: fifteen minutes.

These results show the considerable effectiveness of the process according to the invention.

Below we will now describe several basic means and some variants intended to implement the above process in various heating equipment. The same holds true for incinerators.

In a wood stove or a closed chimney furnace having a metal furnace 1 of the box type comprising a combustion chamber 2 above an ash grill 3, we stipulate, downstream from the furnace, outside the furnace, in the direction of the smoke, a postcombustion chamber 4, adjacent to the furnace, for example, the smoke outlet, which chamber is situated near the furnace, for example, according to one method of execution, adjacent to the furnace, in the back on a smoke duct 5, for example curved downward. This postcombustion chamber is separated from the furnace by a metal wall or plate 6.

As can be seen below, many other sites are possible for the chamber. It should simply be placed as close as possible to the smoke outlet but outside the furnace.

The postcombustion chamber 2 has an opening, for example lateral, acting as an inlet 7 for an aeraulic channel 8 for inputting new or secondary air from the room or from outside. This channel is occupied over the entire right section by an electric heating block 9 traversed by the flow of new preheated or non-preheated air, made advantageously in the form of a heating cartridge equipped with electric heating resistances.

As can be seen below, we anticipate a variant with several channels, either independent or as double channel, one channel of which is occupied by an electric block enabling electric heating of a lesser power.

The combustion chamber also has a smoke outlet and inlet.

Advantageously, the air is drawn into the room and preheated in contact with the walls of the furnace or in contact with the smoke, by means of an exchanger, after it leaves the furnace as far as the combustion chamber, then heated by an electric heating means to the desired temperature.

Thus, in terms of means, according to an interesting variant, the new-air preheating circuit is adjoined to the smoke-exhaust circuit from its furnace outlet as far as the postcombustion chamber.

Of course, the electric heating element is situated downstream near the inlet to the postcombustion chamber.

This concerns the triggering temperature, i.e. the temperature that triggers the postcombustion in the initial phase, then the self-maintenance temperature.

The current of air is natural or forced by a fan or a turbine 10 from an air inlet that is totally or partially blockable.

The unit for controlling and regulating the electrical energy of the means of heating the injected air flow is composed, for example, in the basic version, of two temperature sensors 11 and 12 mounted respectively in the combustion chamber 2 and in the postcombustion chamber 4. These sensors are connected to an electronic control circuit 13 acting on the electric-energy feed of the secondary-air heating means and, if any, on its flow capacity, by means of the fan or the turbine 10.

The sensor 11 of the combustion chamber 2 detects the rise in temperature to control the means of heating the secondary air. The second sensor 12, mounted in the postcombustion chamber, is a safety sensor that transmits to the control circuit the postcombustion start and end signal, making it possible to verify the proper operation at any time and to order the stoppage or decrease in electric heating energy. Another safety sensor 14 can exist on the air-injection circuit which provides information about the functioning of the heating cartridge.

Advantageously, the heating cartridge can be comprised of a honeycomb structure made, for example, by molding a silicon carbide material, placed in the aeraulic channel over the entire right section to be traversed completely by the flow of secondary air.

We can also use surface circuits or resistive coatings. Simple coiled electric resistances are also suitable.

Figure 2:
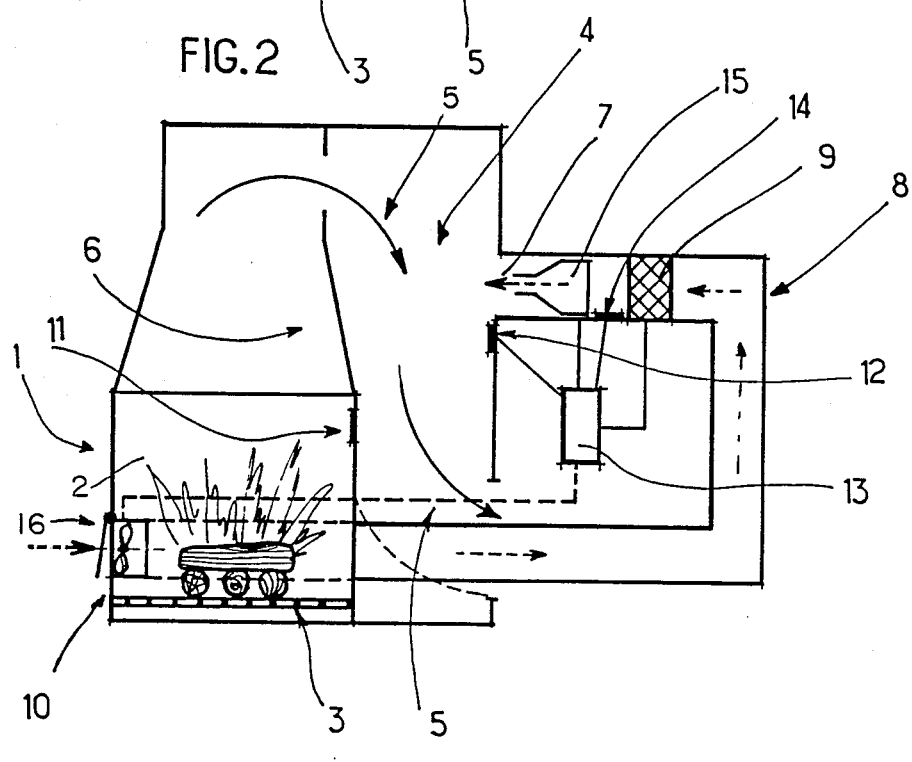
FIG. 2 is a vertical-section schematic view of a closed chimney furnace with postcombustion chamber and injection of a current of preheated air enriched with active oxygen or ozone.

According to one specific execution, we anticipate, in addition to the heating cartridge or in isolation, an ozone generator 15 at the outlet of the conduit or aeraulic channel 8 providing the preheated new air, as shown in FIG. 2.

The inlet of air from the new-air supply circuit is partially o totally blockable by a shutter 16 or another device controlled from the sensors 12 and 14.

The process implemented by the means described above is distinguished by the following characteristics.

We inject laterally into the postcombustion chamber 4 situated beyond the furnace a flow of new air brought, during the combustion-start phase, to a temperature of at least 400 degrees centigrade until autocombustion is triggered in the postcombustion chamber. This flow of secondary air is heated by electric heating means, for example by a heating cartridge situated in the aeraulic channel 8 for injection of secondary air drawn from the outside, which cartridge is equipped with a series of electric resistances according to the required power. It is, for example, traversed entirely by the flow of air.

This secondary air is, preferably, preheated beforehand along the walls of the furnace or by the heat of the smoke. It contains a minimal percentage of oxygen of 6% but preferably from 12% to 16%.

We detect the rise in temperature in the furnace 2 by the sensor 11 to automatically control the means of electric heating of the flow of injected air.

We detect the autocombustion to bring the temperature of the air flow to a minimum value of from 200 to 400 degrees centigrade.

At each rise in temperature of the combustion chamber, we order a new phase of heating of the air flow to a temperature of at least 400 degrees centigrade, for example 500 degrees centigrade, until autocombustion, i.e. self-maintenance of the postcombustion corresponding to each reactivation of the fire detected by the temperature sensor 12 in the postcombustion chamber 4.

We will now examine, with reference to FIGS. 3 to 8, specific executions implementing the process according to the invention.

Figure 3:
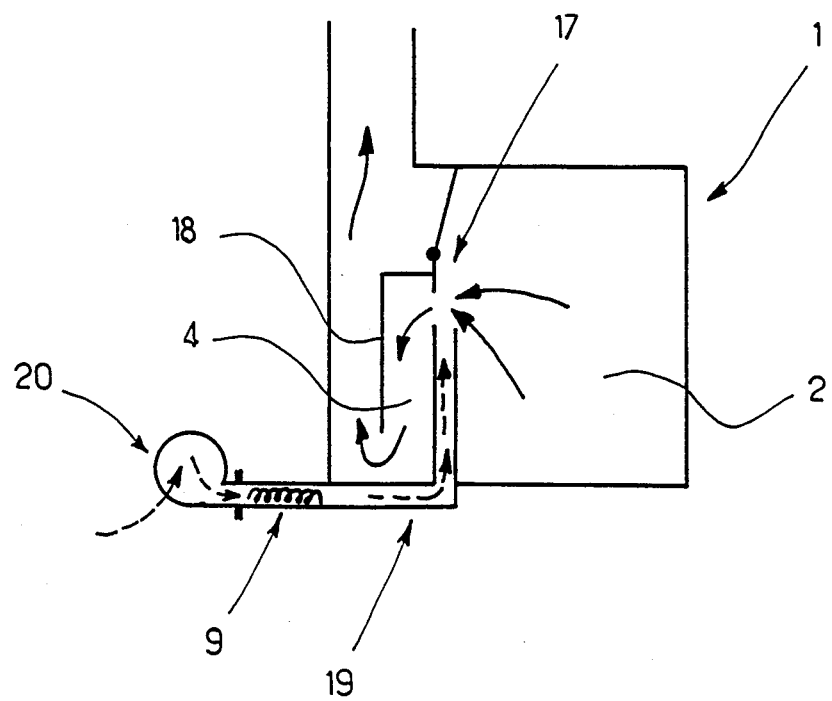
FIG. 3 is a vertical-section of a closed furnace equipped with a postcombustion chamber integrated laterally into the furnace.

According to the variant represented in FIG. 3, the postcombustion chamber 4 of the closed furnace 1 is integrated into the furnace, in its back part. It has an inlet 17 for the passage of the smoke emitted.

It is shaped like a baffle by a partition 18 and comprises the smoke-outlet duct in steady operation of the furnace.

Conventionally, a valve for direct exhaust of the smoke makes emergency or safety exhaust possible, for example.

The secondary-air supply circuit is formed, for example, by a conduit 19 connected at its outside end to a fan 20 and opening at its other end onto the inlet 17 of the postcombustion chamber.

The conduit contains the electric heating block 9 represented by an electric coil.

The conduit comes from the outside of the furnace under the postcombustion chamber and runs up along the furnace's back wall.

To provide the preheating, at least one surface of the conduit is in contact with the wall of the furnace.

Figure 4:
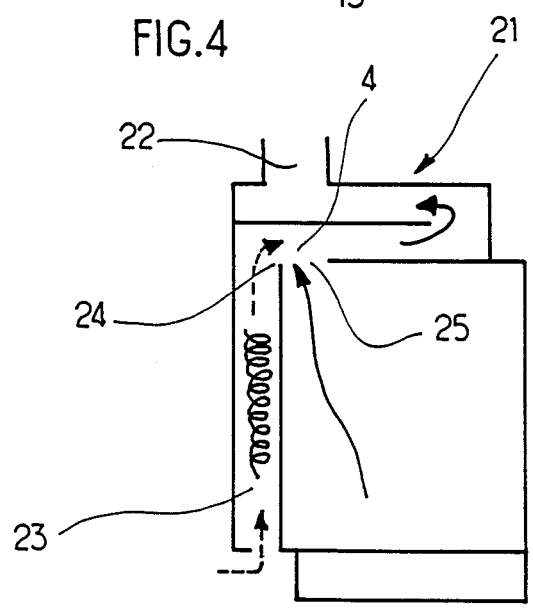
FIG. 4 is a vertical section of a closed furnace equipped with a postcombustion chamber above the furnace.

According to the variant represented in FIG. 4, the postcombustion chamber 4 of the closed furnace 1 is integrated into the upper part of the furnace.

This chamber communicates with an upper exchanger 21 toward an exhaust conduit 22.

The secondary-air supply circuit is a channel 23 which passes behind the back wall of the furnace, this wall comprising, for example, one of the lateral sides.

The secondary air enters the channel, at its base, by natural suction into the channel occupied for a portion of its length by the heating block 9 and its upper part opens 24 into the postcombustion chamber 4.

Similarly, the upper portion of the furnace opens 25 into the postcombustion chamber 4.

Figure 5A:
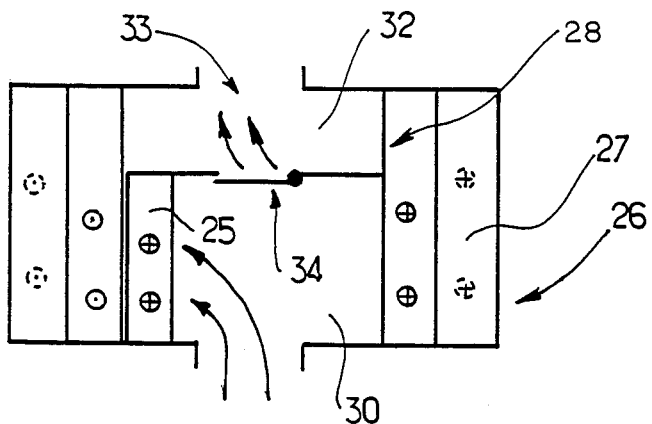
FIGS. 5a and 5b are sectional views, respectively vertical and horizontal, of a modular unit with concentric circuits comprising a postcombustion module with exchanger to be mounted on a closed chimney furnace.
Figure 5B:
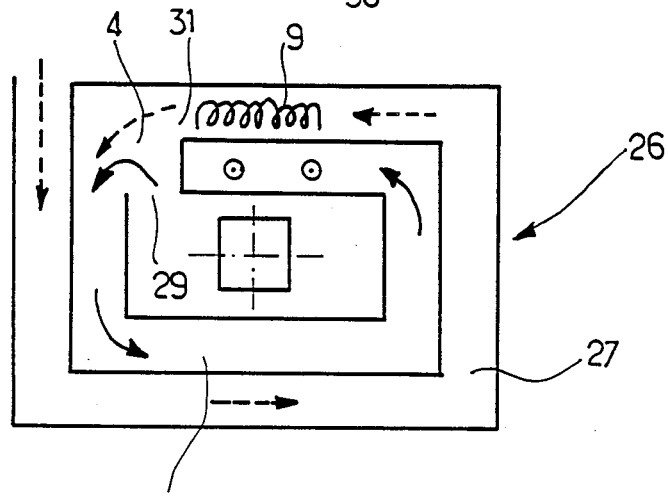

We will now describe a modular variant with reference to FIGS. 5a and 5b in which the secondary air is reheated in an exchanger in contact with the smoke.

The unit is mounted in the form of a modular block 26 to be mounted above a heating unit, specifically a closed chimney furnace.

This module constitutes a simple upper part above the closed furnace on which it is mounted. It is sufficient to join it or to affix it mechanically and to connect it aeraulically to the exhaust conduit for the smoke leaving the unit.

In addition to its general modular configuration, it has the peculiarity of comprising a concentric exchanger between the smoke and the secondary air.

More particularly, the postcombustion module represented is composed of an outside circuit 27 encircling an inside circuit 28 as represented in FIGS. 5a and 5b. The two circuits are arranged in juxtaposition side by side. The outside circuit 26 supplies the secondary air to the postcombustion chamber. It contains the heating block 9. The inside circuit 28 evacuates the smoke from the furnace. The furnace starts at an outlet 29 of a collecting box 30. The outlet opens into the postcombustion chamber 4 which has another inlet 31 near the heating block 9 which comprises the end of the outside circuit 27.

The inside smoke circuit is developed by rising to reach an outlet chamber 32 which communicates with an exhaust conduit 33.

A valve 34 for direct exhaust of the smoke is also stipulated between the gathering box and the outlet chamber 32.

This variant uses the heat contained in the smoke to preheat the secondary air.

It constitutes one of the most effective and best adapted exchangers.

We will now describe two variants implementing the tiered postcombustion, i.e. the division of the new-air or secondary-air supply circuit into two separate circuits, one called a heating circuit 35 containing the heating block 9 and the other called a preheating circuit 36.

Figure 6:
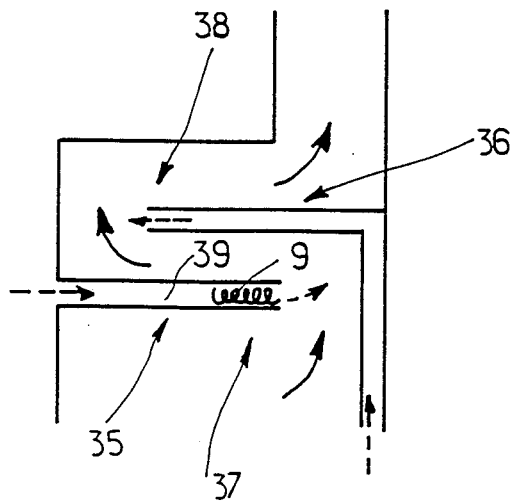
FIGS. 6, 7 and 8 are characteristic diagrams of aeraulic circuits of new air, in dotted lines, and smoke, in heavy lines, between the furnace, the postcombustion chamber and the smoke outlet into the chimney.
Figure 7:
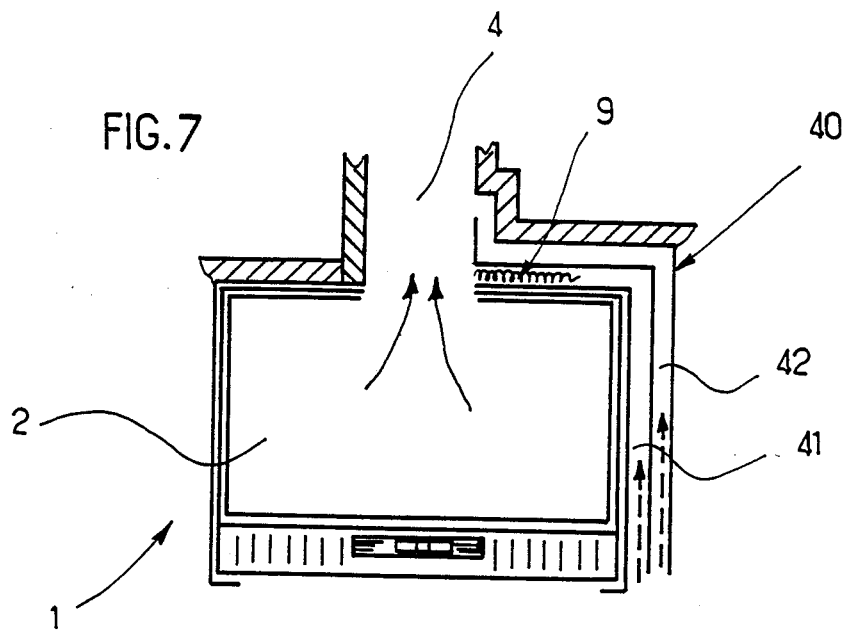

These variants are represented in FIGS. 6 and 7.

The variant represented in FIG. 6 contains two separate channels shifted in height so as to inject the secondary air at different levels.

Thus, in the postcombustion chamber, there is a first zone of lower injection 37 of secondary air at high temperature and a second zone of injection 38 above the first at a lower temperature.

Into the first zone there opens a heating conduit 39 equipped with the heating block 9 supplying the new air at a high temperature, for example 500 degrees centigrade. Into the second zone of injection 38 there opens another conduit, separate from the first, that runs along, for example, the furnace wall in order to preheat the air.

The variant represented in FIG. 7 is the type with a double channel 40 that runs along the furnace. The double channel 40 is divided into parallel channels 41 and 42 side by side, respectively, the heating channel and the preheating channel.

The heating channel is equipped, at its outlet, with the heating block 9. It opens into the postcombustion chamber 4 at a low level. The temperature of the new air injected is set at the temperature for triggering the postcombustion, for example 500 degrees centigrade.

The preheating channel is free. It opens into the postcombustion chamber at a high level. The temperature of the new air ejected is less than the threshold for triggering the postcombustion, between 200 and 400 degrees centigrade.

Figure 8:
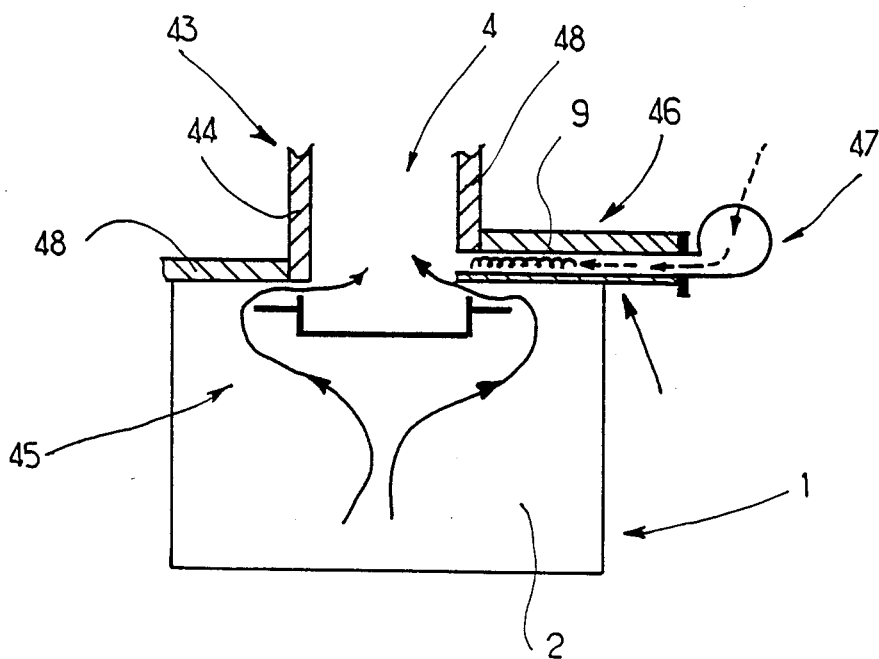

The last variant represented in FIG. 8 is called the exhaust variant.

This variant applies to a furnace with a smoke conduit 43 having an origin 44 starting from a smoke box 45.

According to the specific characteristic of this variant, the postcombustion chamber 4 is comprised of or integrated into the source 44 of the smoke conduit 43. An aeraulic channel 46 opens laterally into the smoke box 43 at the base of the smoke box. This conduit transports the new air for example blown by means of a fan 47.

The heating channel 46 can be alone or doubled with a preheating channel as in certain variants described above.

Of course, this method of execution necessitates an origin 44 of the smoke conduit with an adapted structure. Indeed, the heat released by the postcombustion is sufficiently great that it must be evacuated more rapidly than by simple radiation.

Thus, the metal that makes up the origin of the smoke conduit will be resistant to the high temperatures and the origin 44 will be used preferably as the central element in a heat exchanger or will be insulated thermally by a thick covering 48.

Various other possibilities exist such as, for example, a tip with flanges onto which the blown air is projected.

We claim:

1. A process for implementing post-combustion of unburned gas and volatile materials issuing from the combustion of solid fuels within a combustion chamber of heating equipment, such as, for example, boilers, furnaces, incinerators, and the like, comprising the steps of:

establishing a flow of fresh combustive air within a conduit which is fluidically connected at one end thereof to a source of fresh combustive air and to a post-combustion chamber, which is located within the vicinity of an outlet of said combustion chamber, at an opposite end thereof;

pre-heating said flow of fresh combustive air within said conduit, by means independent of said combustion within said combustion chamber, to a temperature level of at least 400° C.;

detecting the temperature levels within said combustion chamber and said post-combustion chamber;

injecting said pre-heated air flowing within said conduit into said post-combustion chamber when said temperature level detected within said combustion chamber is indicative of combustion within said combustion chamber and until said temperature level detected within said post-combustion chamber is indicative of self-maintenance of post-combustion within said post-combustion chamber;

decreasing the temperature level of said air flow within said conduit to a predetermined level less than said 400° C. temperature level upon detection of said temperature level within said post-combustion chamber indicative of said self-maintenance of said post-combustion within said post-combustion chamber, while continuing to inject said air flow from said conduit into said post-combustion chamber;

detecting an increase in the temperature level within said combustion chamber indicative of reactivation of said combustion within said combustion chamber; and increasing the temperature level of said fresh combustive air flowing within said conduit and being injected into said post-combustion chamber to at least 400° C. so as to again implement self-maintenance of said post-combustion within said post-combustion chamber.

2. Process according to claim 1, characterized in that: the temperative level to which said fresh combustive air is pre-heated and increased so as to implement said self-maintenance of said post-combustion within said post-combustion chamber is 500° C.

3. Process according to claim 1, characterized in that the relative quantity of oxygen within said fresh combustive air is greater than 6%.

4. Process according to claim 3, characterized in that the relative quantity of oxygen is from 12% to 16%.

5. Process according to claim 1, characterized in that the flow of said fresh combustive air is also preheated by the heat from the combustion chamber.

6. Process according to claim 1 characterized in that the flow of said fresh combustive air is also preheated by the heat contained in the smoke issuing from said combustion chamber.

7. Process according to claim 1 characterized in that the predetermined temperature level of said fresh combustive air is reached by eliminating the heating by the independent heating means.

8. Process according to claim 1 characterized in that the predetermined temperature level of said fresh combustive air is from 200 to 400 degrees centigrade.

9. Process according to the claim 1 characterized in that the fresh combustive air is injected at two different levels into the postcombustion chamber.

10. Process according to claim 9 characterized in that the circuit of the fresh combustive air coming from the heating circuit containing the independent heating means is injected into the postcombustion chamber at a lower level.

11. Process according to the claim 1, characterized in that the independent heating means outside the furnace are electric.

12. Process according to claim 11, characterized in that:
the electric heating means are in the form of a heating block comprising a cartridge, having electric resistance means contained therein, disposed within said conduit.

13. Process according to the claim 1, characterized in that the flow of said fresh combustive air injected into said post-combustion chamber is enriched with active oxygen.

14. Process according to claim 13, characterized in that the active oxygen is pre-heated atmospheric air.

15. Process according to claim 13, characterized in that the flow of air is enriched with ozone.

16. Process according to claim 1, characterized in that the flow of fresh combustive air is enriched by a catalytic or oxidizing gas or gaseous complex that facilitates combustion.

17. Process according to claim 1, characterized in that the heating of the air in the fresh combustive air flow is controlled by a sensor for detecting the combustion chamber temperature and an electronic circuit (13).

18. Process according to claim 1, characterized in that the fresh combustive air flow is injected into post-combustion chamber by a fan or a turbine with in conjunction with the operation of a movable blocking element in the air inlet.

19. Process according to claim 1, characterized in that the air inlet of the fresh combustive air flow is totally or partially blockable during the initial phase preceding the postcombustion.

20. Apparatus for implementing post-combustion of unburned gases and volatile materials issuing from the combustion of solid fuels within a combustion chamber of heating equipment, such as, for example, boilers, furnaces, incinerators, and the like, comprising:
a combustion chamber;
a post-combustion chamber located within the vicinity of an outlet of said combustion chamber;
conduit means, having heating means disposed therein, fluidically connected at one end thereof to a source of fresh combustive air, and fluidically connected at an opposite end thereof to said post-combustion chamber, for injecting pre-heated fresh combustive air, pre-heated by said heating means to a temperature level of at least 400° C., into said post-combustion chamber;
means for detecting the temperature level within said combustion chamber; and
means for controlling said heating means within said conduit means in response to the temperature level detected within said combustion chamber.

21. Device according to claim 20, characterized in that:
the fresh combustive-air conduit means further comprises a means for preheating said fresh combustive air using the heat from said combustion chamber.

22. Device according to claim 20 characterized in that the fresh combustive air is preheated using the heat contained in the smoke issuing from said combustion chamber before said smoke reaches the postcombustion chamber.

23. Device according to claim 22, characterized in that the preheating means is a smoke heat exchanger, which exchanger is placed between the combustion chamber smoke outlet and the postcombustion chamber.

24. Device according to claim 23, characterized in that:
said fresh combustive-air preheating conduit means comprises an intake circuit which is adjoined to a circuit for evacuating the smoke from said combustion chamber and which extends in a circuitous manner from said smoke outlet of said combustion chamber, through said post-combustion chamber, and back to said post-combustion chamber, said heating means being disposed within a downstream portion of said intake circuit.

25. Device according to claim 20, characterized in that:
said post-combustion chamber is adjoined to said combustion chamber and is separated from said combustion chamber by means of a metal wall which forms one side of said post-combustion chamber and there is provided a baffle which forms an opposite side of said post-combustion chamber.

26. Device according to claim 20 characterized in that the postcombustion chamber is situated on the upper part of the combustion chamber as close as possible to the combustion chamber outlet.

27. Device according to claim 20 characterized in that the postcombustion chamber is the outlet of the combustion chamber.

28. Device according to claim 20 characterized in that the postcombustion chamber is integrated into the combustion chamber.

29. Device according to claim 20 characterized in that the independent means of pre-heating said fresh combustive air is an electric heater.

30. Device according to claim 29, characterized in that the means of electric is a cartridge equipped with heating electric resistance means, which cartridge is placed in the fresh combustive air conduit means near said conduit's inlet into the postcombustion chamber.

31. Device according to claim 30, characterized in that the fresh combustive air conduit means is divided into one heating circuit containing the electric heating cartridge and one preheating circuit.

32. Device according to claim 31, characterized in that the circuits' inlets into the postcombustion chamber are at different levels and in that the heating circuit inlet is situated at the lower level.

33. Device according to claim 32, characterized in that the heating and preheating circuits are contained in the same channel of a heat exchanger that exchanges heat with the heat from the combustion chamber or the smoke.

34. Device according to claim 31, characterized in that the heating circuit and the smoke circuit beyond the preheating outlet of the combustion chamber form an exchanger.

35. Device according to claim 34, characterized in that the exchanger is comprised of an outside circuit for the fresh combustive air and an inside circuit for the smoke, the two circuits being juxtaposed and concentric.

36. Device according to claim 34, characterized in that the exchanger, the postcombustion chamber and the inlet and outlet for said smoke before and after the postcombustion chamber constitute a modular unit to be mounted on a closed chimney furnace.

* * * * *